United States Patent
Zhang

(10) Patent No.: US 9,729,627 B2
(45) Date of Patent: Aug. 8, 2017

(54) METHOD AND APPARATUS FOR USE IN P2P STREAMING SYSTEM OVER MOBILE NETWORK

(75) Inventor: Shunliang Zhang, Beijing (CN)

(73) Assignee: Telefonaktiebolaget L M Ericsson (pub), Stockholm (SE)

( * ) Notice: Subject to any disclaimer, the term of this patent is extended or adjusted under 35 U.S.C. 154(b) by 293 days.

(21) Appl. No.: 14/420,661

(22) PCT Filed: Aug. 9, 2012

(86) PCT No.: PCT/CN2012/079888
§ 371 (c)(1),
(2), (4) Date: Feb. 9, 2015

(87) PCT Pub. No.: WO2014/023004
PCT Pub. Date: Feb. 13, 2014

(65) Prior Publication Data
US 2015/0229712 A1 Aug. 13, 2015

(51) Int. Cl.
*H04L 29/08* (2006.01)
*H04L 29/06* (2006.01)
*H04W 4/18* (2009.01)

(52) U.S. Cl.
CPC ........ *H04L 67/104* (2013.01); *H04L 65/4069* (2013.01); *H04L 65/60* (2013.01);
(Continued)

(58) Field of Classification Search
USPC ................................................ 709/231, 204
See application file for complete search history.

(56) References Cited

U.S. PATENT DOCUMENTS

2011/0225311 A1* 9/2011 Liu ................ H04L 45/125
709/231
2011/0225312 A1* 9/2011 Liu ................. H04L 12/18
709/231
(Continued)

FOREIGN PATENT DOCUMENTS

| CN | 101465785 A | 6/2009 |
| CN | 102055787 A | 5/2011 |

(Continued)

OTHER PUBLICATIONS

PCT Notification of Transmittal of International Preliminary Report on Patentability Chapter I and Written Opinion of the International Searching Authority for International Application No. PCT/CN2012/079888, dated Feb. 19, 2015; 6pgs.

(Continued)

*Primary Examiner* — Tammy Nguyen
(74) *Attorney, Agent, or Firm* — Nicholson De Vos Webster & Elliott, LLP

(57) ABSTRACT

The present disclosure relates to a method for use in a Peer to Peer (P2P) streaming system over a mobile network, the method comprising: receiving from a P2P tracker of said at least one P2P tracker a notification message indicating a first mobile peer to be served by the first P2P proxy and request information of the first mobile peer indicating a first media content requested by the first mobile peer and peers where the first media content is available, the peers being not served by the first P2P proxy; checking whether the first media content is buffered in the first P2P proxy; initiating a P2P session with at least one or more peers among the peers to fetch the first media content, when the first media content is not buffered in the first P2P proxy; and sending the fetched first media content to the first mobile peer.

34 Claims, 12 Drawing Sheets

(52) U.S. Cl.
CPC ...... *H04L 67/1074* (2013.01); *H04L 67/2861* (2013.01); *H04L 67/2842* (2013.01); *H04W 4/18* (2013.01)

(56) References Cited

U.S. PATENT DOCUMENTS

| | | | |
|---|---|---|---|
| 2012/0136935 A1 | 5/2012 | Tcha et al. | |
| 2012/0317197 A1* | 12/2012 | De Foy | H04L 67/1063 709/204 |
| 2015/0229712 A1* | 8/2015 | Zhang | H04L 65/60 709/204 |
| 2016/0226899 A1* | 8/2016 | Reddy | H04L 63/1425 |

FOREIGN PATENT DOCUMENTS

| | | |
|---|---|---|
| CN | 102232300 A | 11/2011 |
| JP | 2009104377 A | 5/2009 |
| WO | WO-2008017505 A1 | 2/2008 |

OTHER PUBLICATIONS

Extended European Search Report, EP Application No. 12882610.4, dated Jun. 11, 2015, 10 pages.

PCT International Search Report for International Application No. PCT/CN2012/079888, filed Aug. 9, 2012; 3pgs.

Liu et al., "BlueStreaming: Towards Power-Efficient Internet P2P Streaming to Mobile Devices," Scottsdale, Arizona, USA; copyright 2011; MM'11, Nov. 28, 2011; 10pgs.

Hei et al., "A Measurement Study of a Large-Scale P2P IPTV System," IEEE Transactions on Multimedia; vol. 9; No. 8; copyright IEEE 2007; Dec. 2007; 16pgs.

Tan et al., "SCAP: Smart Caching in Wireless Access Points to Improve P2P Streaming," 27th ICDCS, copyright IEEE 2007; 8pgs.

* cited by examiner

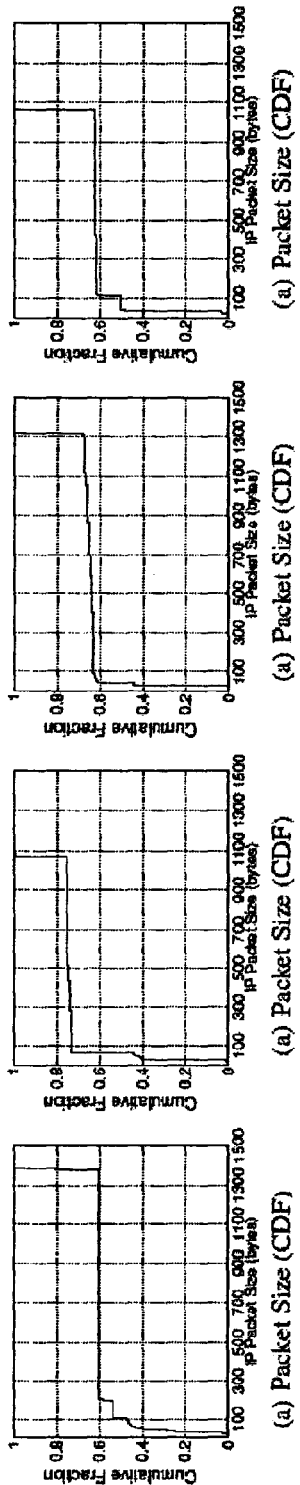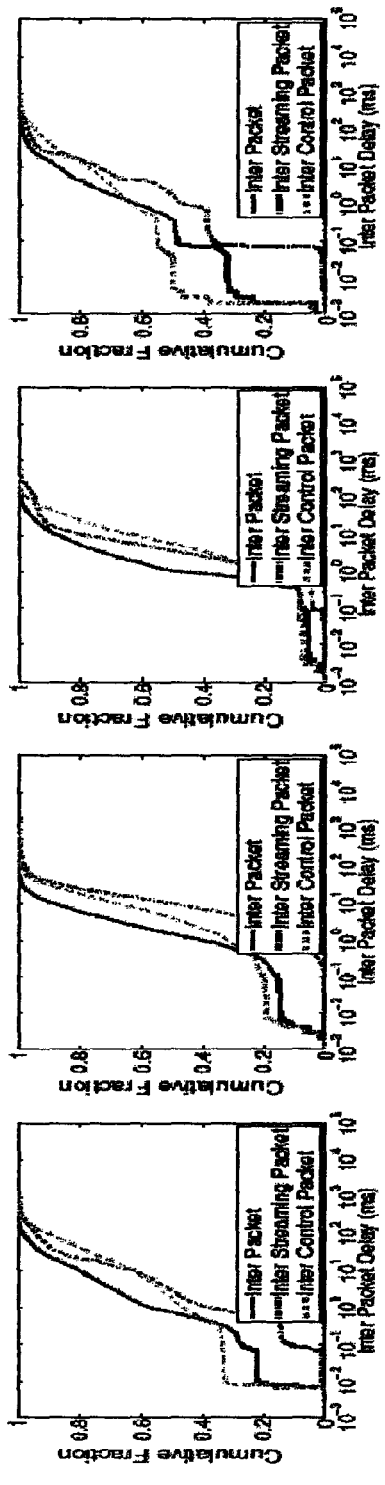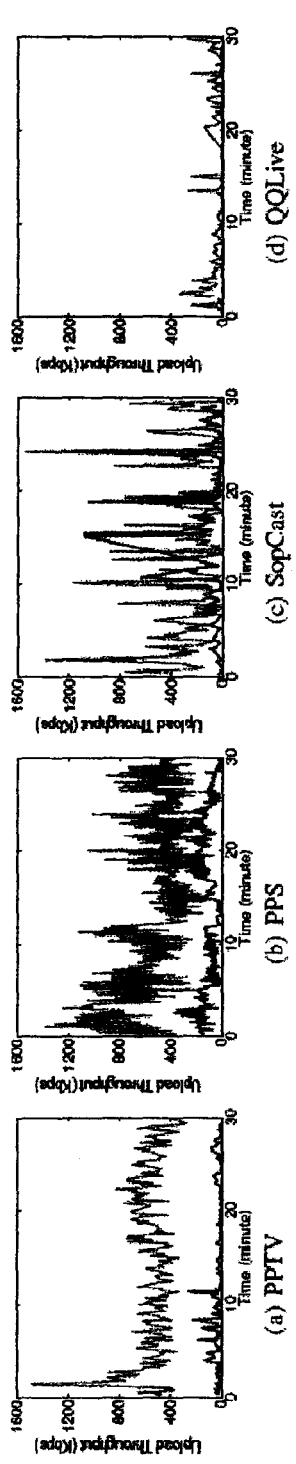

METHOD AND APPARATUS FOR USE IN P2P STREAMING SYSTEM OVER MOBILE NETWORK

CROSS-REFERENCE TO RELATED APPLICATIONS

This application is a National stage of International Application No. PCT/CN2012/079888, filed Aug. 9, 2012, which is hereby incorporated by reference.

TECHNICAL FIELD

The disclosure generally relates to communication systems, and more particularly, to a method and an apparatus for use in a Peer to Peer (P2P) streaming system over a mobile network.

BACKGROUND

Unless otherwise indicated herein, the approaches described in this section are not prior art to the claims in this disclosure and are not admitted to be prior art by inclusion in this section.

Recently, due to the rapid growth of smart phone penetration, data traffic in the mobile network is experiencing explosive growth. Among all types of mobile data traffic, streaming is one important part. According to a report, by the end of the first quarter of 2011, video traffic accounts for 39% of the mobile data traffic. Besides, according to a forecast, video streaming may account for about 70% of the mobile data traffic at 2016. Along this trend, several streaming delivery approaches have been deployed and studied. Among all the methods, P2P is one important approach to deliver streaming content over networks. Some P2P based live streaming systems have been used in context of fixed access networks, such as PPlive and PPstream.

However, the existing P2P streaming system used in fixed networks would face some serious problems when it comes to mobile networks. For example, from a mobile terminal aspect, UL transmission from the mobile terminal is much more power consuming as compared with DL reception, and a mobile terminal is usually power constrained due to its limited battery capacity and movement. Furthermore, UL bandwidth of typical 3GPP mobile networks is usually more limited as compared with that of DL. On the other hand, typical P2P systems basically depend on UL contribution from peers. Therefore, a potential topic is how to optimize P2P live streaming by considering specific characteristics and restrictions of the mobile network/mobile terminal, as well as to resolve the churn of P2P live streaming in the mobile network.

To facilitate the understanding of problems of P2P live streaming over mobile networks. The basic architecture and principles of the PPlive streaming are introduced by referring to FIG. 1 (see Reference 1).

FIG. 1 illustrates a basic architecture of a PPlive streaming system. Generally, there are one channel streaming server and one tracker server as P2P infrastructure fundamental elements for a PPlive streaming system. To boost performance of the P2P streaming system, one or more super nodes may be deployed as well. A streaming peer node includes a streaming engine and a media player co-located in the same machine. All peers cooperatively deliver video chunks among themselves from the channel streaming server via the streaming engine. The channel stream server converts media content into small video chunks for efficient distribution among peers. The tracker server provides streaming channel, peer and chunk information for each peer node to join the network and download video chunks from multiple peers in the system requesting the same media content.

So far, there are already a couple of academic studies on the typical P2P live streaming system in both of the fixed and wireless environments. Here, results from a previous study (see Reference 2) on P2P live streaming systems (e.g., PPlive, PPstream, SopCast, QQstream) are indicated to explain the problem by referring to the following Table 1 and FIG. 2, FIG. 3 and FIG. 4 together.

TABLE 1

Summary of Statistics on Laptop

| Name | Architecture | Encoding Rate (Kbps) | Total # of IP Packets | Total # of Control Packets | Total # of Streaming Packets | Sleep Time (%) | Average # of Neighbors |
|---|---|---|---|---|---|---|---|
| PPTV | P2P | 400 | 191716 | 116819 | 70873 | 4.42 | 12 |
| PPS | P2P | 396 | 433935 | 322779 | 85180 | 0.09 | 20 |
| SopCast | P2P | 530 | 305826 | 202240 | 92457 | 0.99 | 3 |
| QQLive | P2P | 500 | 293474 | 183814 | 108827 | 7.12 | 4 |
| J.tv | C/S | 433 | 123655 | 56689 | 66966 | 21.44 | N/A |

Key observations from the previous study are as follows:

A P2P streaming peer needs to transmit an extremely large number of C-plane small packets which account for more than 60%. Besides, C-plane and U-plane packets are usually transmitted together.

The amount of uploading traffic from a peer to its neighbors changes dynamically from 10 Kbps to over 1.5 Mbps. The UL/DL traffic ratio is about 1:1 for PPTV and 5:3 for PPS.

A client in P2P streaming receives packets from dynamically changing sources (e.g., 3 to 20 peers). More peers usually mean more C-plane traffics and more UL U-plane traffics.

So a new mechanism is needed when establishing a P2P streaming system over a mobile network.

SUMMARY

According to the present disclosure, a P2P proxy function is introduced in mobile networks to provide a P2P streaming system over a mobile network.

In a first aspect of the present disclosure, there is provided a method for use in a P2P streaming system over a mobile network, the P2P streaming system including at least one P2P proxy, at least one P2P tracker and a plurality of mobile peers, the method being used in a first P2P proxy of said at least one P2P proxy and including: receiving from a P2P tracker of said at least one P2P tracker a notification message indicating a first mobile peer to be served by the first P2P proxy and request information of the first mobile peer indicating a first media content requested by the first mobile peer and peers where the first media content is available, the peers being not served by the first P2P proxy; checking whether the first media content is buffered in the first P2P proxy; initiating a P2P session with at least one or more peers among the peers to fetch the first media content, when the first media content is not buffered in the first P2P proxy; and sending the fetched first media content to the first mobile peer.

In one example, the method may further include sending the first media content to the first mobile peer when the first media content is buffered in the first P2P proxy.

In another example, the method may further include acquiring uplink load information of a cell in the mobile network; and informing the P2P tracker that the first P2P proxy will serve a number of mobile peers located in the cell or the first P2P proxy will not serve the number of mobile peers located in the cell, based on the uplink load information.

Alternatively, when the uplink load is higher than a first predetermined threshold, the P2P tracker may be informed that the first P2P proxy will serve the number of mobile peers located in the cell.

Alternatively, when the uplink load is lower than a second predetermined threshold, the P2P tracker may be informed that the first P2P proxy will not serve the number of mobile peers located in the cell.

As yet another example, the method may further include informing a second P2P proxy selected from said at least one P2P proxy that at least a part of mobile peers served by the first P2P proxy need to be served by the second P2P proxy when load of the first P2P proxy and/or backhaul link load of the mobile network exceeds a third predetermined threshold; and informing the P2P tracker that the first P2P proxy will not serve the at least part of mobile peers.

Alternatively, the second P2P proxy may be located in a gateway or a base station of the mobile network.

Alternatively, the method may further include informing the second P2P proxy that the at least part of mobile peers will be served by the first P2P proxy again, when the load of the first P2P proxy and/or backhaul link load of the mobile network becomes lower than a fourth predetermined threshold.

As still another example, the method may further include if a second peer not served by the first P2P proxy requests from the P2P tracker a second media content available in a mobile peer served by the first P2P proxy, sending the second media content to the second peer when the second media content is buffered in the first P2P proxy.

In another example, the first media content may include a plurality of media chunks, and sending the fetched first media content to the first mobile peer may include: bundling the plurality of media chunks into one or more packages, each package having a bigger size than each media chunk; and transmitting the one or more packages to the first media peer in a burst.

In still another example, the method may further include actively sending to the first mobile peer buffer map information about the requested first media content, after establishing a P2P session between the first P2P proxy and the first mobile peer, the buffer map information being constructed based on the first media content.

In a second aspect of the present disclosure, there is provided a method for use in a P2P streaming system over a mobile network, the P2P streaming system comprising at least one P2P proxy, at least one P2P tracker and a plurality of mobile peers, the method being used in a P2P tracker of said at least one P2P tracker and including: receiving from a first mobile peer a request for a first media content; checking if the first mobile peer is to be served by a P2P proxy of said at least one P2P proxy; and if it is determined that the first mobile peer is to be served by the P2P proxy, sending to the P2P proxy a message indicating a first media content requested by the first mobile peer and peers where the first media content is available, the peers being not served by the P2P proxy.

In an example, the method may further include if it is determined that the first mobile peer is to be served by the P2P proxy, informing the first mobile peer that the first media content is available on the P2P proxy.

In another example, before receiving from the first mobile peer the request for the first media content, the method may further include: receiving from the P2P proxy a registration message indicating the P2P proxy is to serve a set of mobile peers in the plurality of mobile peers and information indicating which mobile peers are served by the P2P proxy.

Alternatively, information indicating which mobile peers may be served by the P2P proxy depends on uplink load information.

Alternatively, the information indicating which mobile peers may be served by the P2P proxy is a list of IDs of the set of mobile peers or a list of IDs of cells where each mobile peer in the set of mobile peers is located.

Alternatively, the method may further include: storing the information indicating which mobile peers are served by the P2P proxy.

Alternatively, the method may further include sending a registration response to the P2P proxy.

In yet another example, the method may further include: receiving from a second peer not served by the P2P proxy a request message to request a second media content present in a mobile peer served by the P2P proxy; and informing the second peer that the second media content is available on the P2P proxy.

In a third aspect of the present disclosure, there is provided a P2P proxy for use in a P2P streaming system over a mobile network, the P2P streaming system comprising at least one P2P proxy, at least one P2P tracker and a plurality of mobile peers, the P2P proxy including: a receiving unit configured to receive from a P2P tracker of said at least one P2P tracker a notification message indicating a first mobile peer to be served by the P2P proxy and request information of the first mobile peer indicating a first media content requested by the first mobile peer and peers where the first media content is available, the peers being not served by the P2P proxy; a checking unit configured to check whether the first media content is buffered in the P2P proxy; a session initiating unit configured to initiate a P2P session with at least one or more peers among the peers to fetch the first media content, when the first media content is not buffered in the P2P proxy; and a first sending unit configured to send the fetched first media content to the first mobile peer.

In a fourth embodiment of the present disclosure, there is provided a P2P tracker for use in a P2P streaming system over a mobile network, the P2P streaming system comprising at least one P2P proxy, at least one P2P tracker and a plurality of mobile peers, the P2P tracker including: a first receiving unit configured to receive from a first mobile peer a request for a first media content; a checking unit configured to check if the first mobile peer is to be served by a P2P proxy of said at least one P2P proxy; and a sending unit configured to, if it is determined that the first mobile peer is to be served by the P2P proxy, send to the P2P proxy a message indicating a first media content requested by the first mobile peer and peers where the first media content is available, the peers being not served by the P2P proxy.

The embodiments of the present disclosure lead to at least one of the following benefits and advantages:

The P2P proxy is transparent to P2P peers and has no impact on P2P peers;

UL traffic on radio is refrained, thereby leading to power saving for UE;

P2P C-plane traffic is reduced, and further optimization of C-plane is achievable;

Backhaul resource may be saved in case the load of a centralized P2P proxy is not too high;

DL U-plane could be further optimized;

It is possible to make full use of the strength of unicast and P2P system at different situation dynamically by taking radio network load status info into account; and It can combine the strength of centralized P2P proxy architecture and distributed P2P proxy architecture together by taking mobile network load status info and load of proxy into account.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which:

FIG. 2 shows a diagram of IP packet sizes in a typical P2P streaming system;

FIG. 3 shows a diagram of Inter packet delay of a typical P2P streaming system;

FIG. 4 shows UL throughput of a typical P2P streaming system;

DETAILED DESCRIPTION OF EMBODIMENTS

Figure 1:
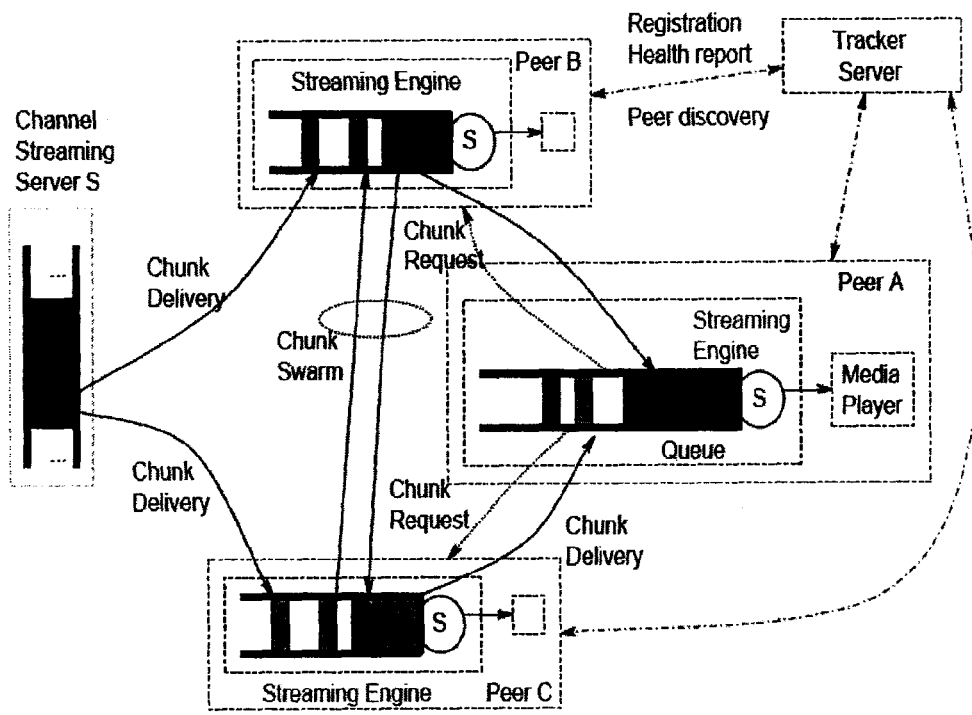
FIG. 1 illustrates a basic architecture of PPlive system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

The inventor found that some potential issue make rise when establishing P2P streaming system over a mobile network. First, too frequent (Short inter-packet delay) P2P U/C-plane packet exchange makes RAN scheduler almost always busy. Service time to other users may be impacted. So it may need to avoid the negative impact on the eNB scheduler and/or other users due to huge and frequent P2P live streaming signaling packets. Second, like other popular smart phone applications such as IM (MSN, QQ), large small IP packets from P2P C-plane may over-consume RAN PHY C-plane capacity, so it may need to prevent the C-plane resource from being over-consumed by P2P applications. Third, limited UL capacity will restrict UL contribution from mobile peers, and frequent UL transmission (short inter packet delay) may drain UE battery quickly. So, it may need to solve this challenge to UE is also important in alleviating the churn of P2P system in the mobile network environment.

Figure 5:
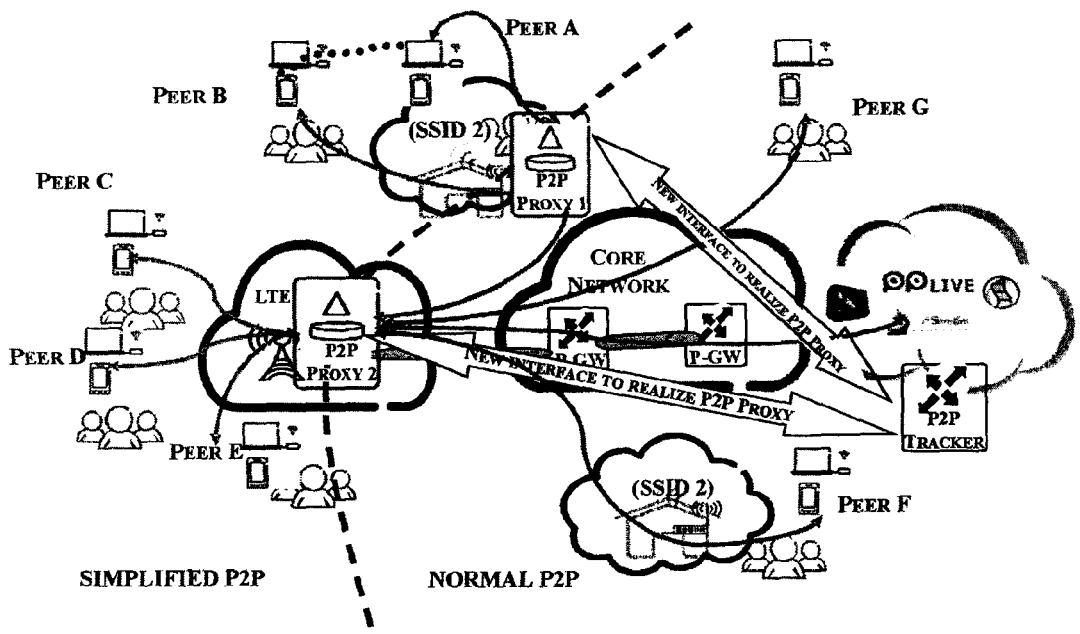
FIG. 5 shows a P2P streaming system where the present disclosure may be applied.

FIG. 5 shows a P2P streaming system where the present disclosure may be applied.

As shown in FIG. 5, a P2P proxy (e.g., P2P proxy 1 and P2P proxy 2) is introduced in the P2P streaming system. The P2P proxy may split the P2P streaming system into two parts. The inside part is a simplified P2P system, and the outside part is a normal P2P system. There is a new interface between the introduced P2P proxy and a P2P tracker. Here, the P2P tracker may manage P2P streaming between different peers, either mobile or fixed peers.

For example, P2P proxy 2 serves Peer C, Peer D, and Peer E. In this case, Peer C, Peer D, and Peer E may be referred to as insider peers of P2P proxy 2, and other peers not served by P2P proxy 2, such as Peer A, Peer B, Peer F, or Peer G, may be referred to as outsider peers of P2P proxy 2.

When P2P proxy 2 operates, it will interact with its outside peers instead of its either inside peer during the P2P streaming process of the inside peer. That is, P2P proxy 2 looks like a normal peer from other peers' aspect. P2P proxy 1 may operate similarly. For example, P2P proxy 1 may also look like a normal peer from P2P proxy 2's aspect.

It should be noted that insider peers of a P2P proxy (e.g., Peers A to E in FIG. 5) may be only mobile peers, which may refer to peers served by a mobile network, such as ERAN, UTRAN, EUTRAN, CMDA2000, WLAN, etc. In contrast, outside peers of a P2P proxy (such as Peer F or Peer G in FIG. 5) may be either mobile or fixed peers.

Although FIG. 5 is exemplified in the context of two P2P proxies, only one P2P proxy or more than two P2P proxies may be also applied here. Moreover, the P2P proxy may be located in RAN, CN or the edge of CN.

Hereinafter, a peer not served by the P2P proxy may be referred to as an outside peer of the P2P proxy, and a mobile peer served by the P2P proxy may be referred to as an inside mobile peer of the P2P proxy.

Figure 6:
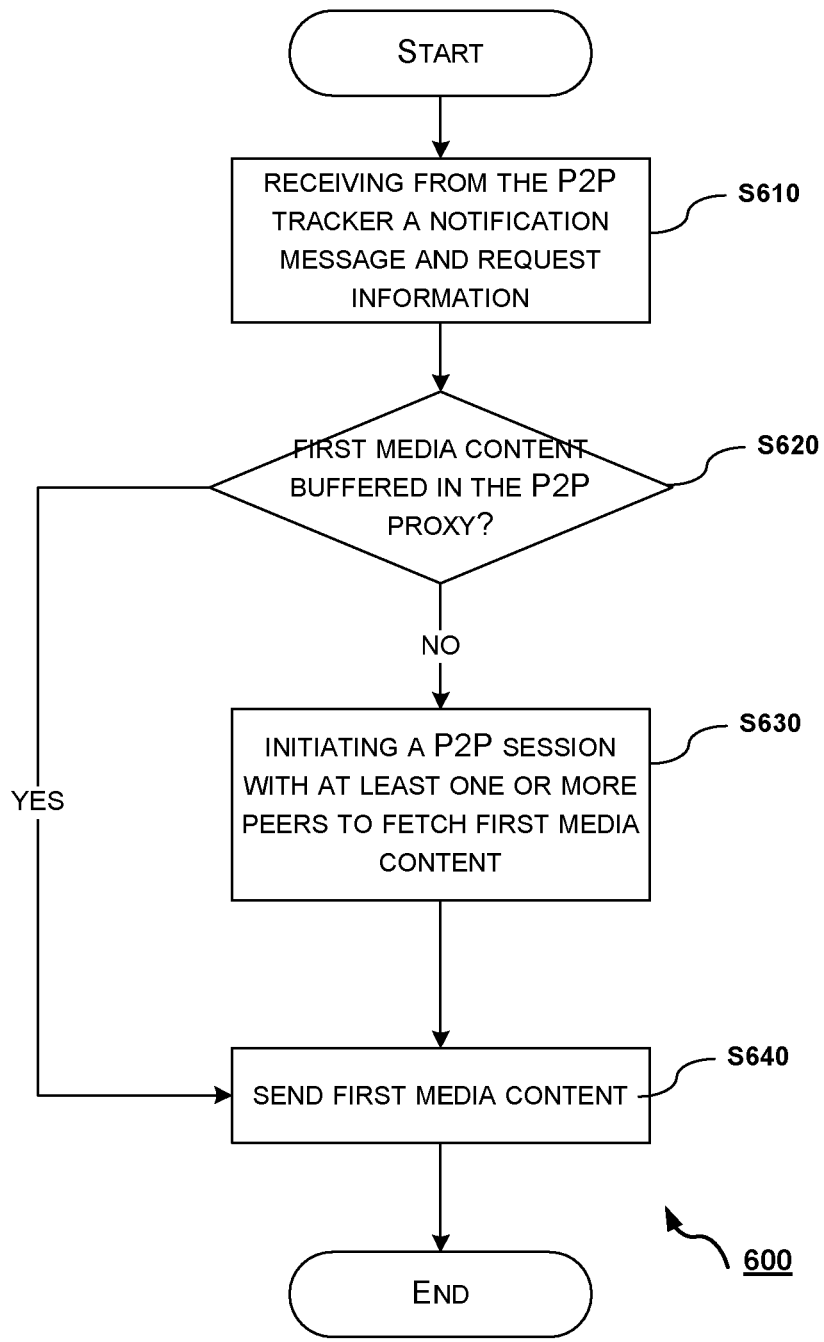
FIG. 6 shows a flowchart of a method 600 for use in a P2P streaming system over a mobile network according to an embodiment of the present disclosure.

FIG. 6 shows a flowchart of a method 600 for use in a P2P streaming system over a mobile network according to an embodiment of the present disclosure. The P2P streaming system may include at least one P2P proxy, at least one P2P tracker and a plurality of mobile peers, e.g., as shown in FIG. 5. The method 600 may be used in a first P2P proxy of said at least one P2P proxy and may include the following steps of: receiving from a P2P tracker of said at least one P2P tracker a notification message indicating a first mobile peer to be served by the first P2P proxy and request information of the first mobile peer indicating a first media content requested by the first mobile peer and peers where the first media content is available (step S610); checking whether the first media content is buffered in the first P2P proxy (step S620); initiating a P2P session with at least one or more peers among the peers to fetch the first media content, when the first media content is not buffered in the first P2P proxy (step S630); and sending the fetched first media content to the first mobile peer (step S640). Preferably, the peers here may refer to those fixed or mobile peers not served by the first P2P proxy.

As a non-limiting example, the method 600 may further include a step of sending the first media content to the first mobile peer when the first media content is buffered in the first P2P proxy.

As a non-limiting example, the method 600 may further include the following steps of: acquiring uplink load information of a cell in the mobile network; and informing the P2P tracker that the first P2P proxy will serve a number of mobile peers located in the cell or the first P2P proxy will not serve the number of mobile peers located in the cell, based on the uplink load information.

Alternatively, when the uplink load is higher than a first predetermined threshold, the P2P tracker is informed that the first P2P proxy will serve the number of mobile peers located in the cell.

Alternatively, when the uplink load is lower than a second predetermined threshold, the P2P tracker is informed that the first P2P proxy will not serve the number of mobile peers located in the cell.

It will be appreciated that the first and second predetermined thresholds may depend on the actual radio environment, and the first predetermined threshold may be equal to or greater than the second predetermined threshold.

As a non-limiting example, the method 600 may further include the following steps of: informing a second P2P proxy selected from said at least one P2P proxy that at least a part of mobile peers served by the first P2P proxy need to be served by the second P2P proxy when load of the first P2P proxy and/or backhaul link load of the mobile network exceeds a third predetermined threshold; and informing the P2P tracker that the first P2P proxy will not serve the at least part of mobile peers.

Alternatively, the second P2P proxy may be located in a core network, such as in a gateway. The second P2P proxy may be located in a radio access network, such as in a base station of the mobile network, or may be independently deployed in the mobile network.

Alternatively, the method 600 may further include a step of: informing the second P2P proxy that the at least part of mobile peers will be served by the first P2P proxy again, when the load of the first P2P proxy and/or backhaul link load of the mobile network becomes lower than a fourth predetermined threshold.

It will be appreciated that the third and fourth predetermined thresholds may depend on the actual radio environment, and the third predetermined threshold may be equal to or greater than the fourth predetermined threshold.

It will be appreciated that the backhaul link load here may refer to backhaul uplink load or backhaul downlink load. This may depend on the applied transport technology, such as Ethernet, SDH, etc.

As a non-limiting example, the method 600 may further include a step of: if a second peer not served by the first P2P proxy requests from the P2P tracker a second media content available in a mobile peer served by the first P2P proxy, sending the second media content to the second peer when the second media content is buffered in the first P2P proxy.

As a non-limiting example, the first media content may include a plurality of media chunks. In this case, the step S640 may include: bundling the plurality of media chunks into one or more packages, each package having a bigger size than each media chunk; and transmitting the one or more packages to the first media peer in a burst.

As a non-limiting example, the method 600 may further include a step of: actively sending to the first mobile peer buffer map information about the requested first media content, after establishing a P2P session between the first P2P proxy and the first mobile peer, the buffer map information being constructed based on the first media content.

Figure 7:
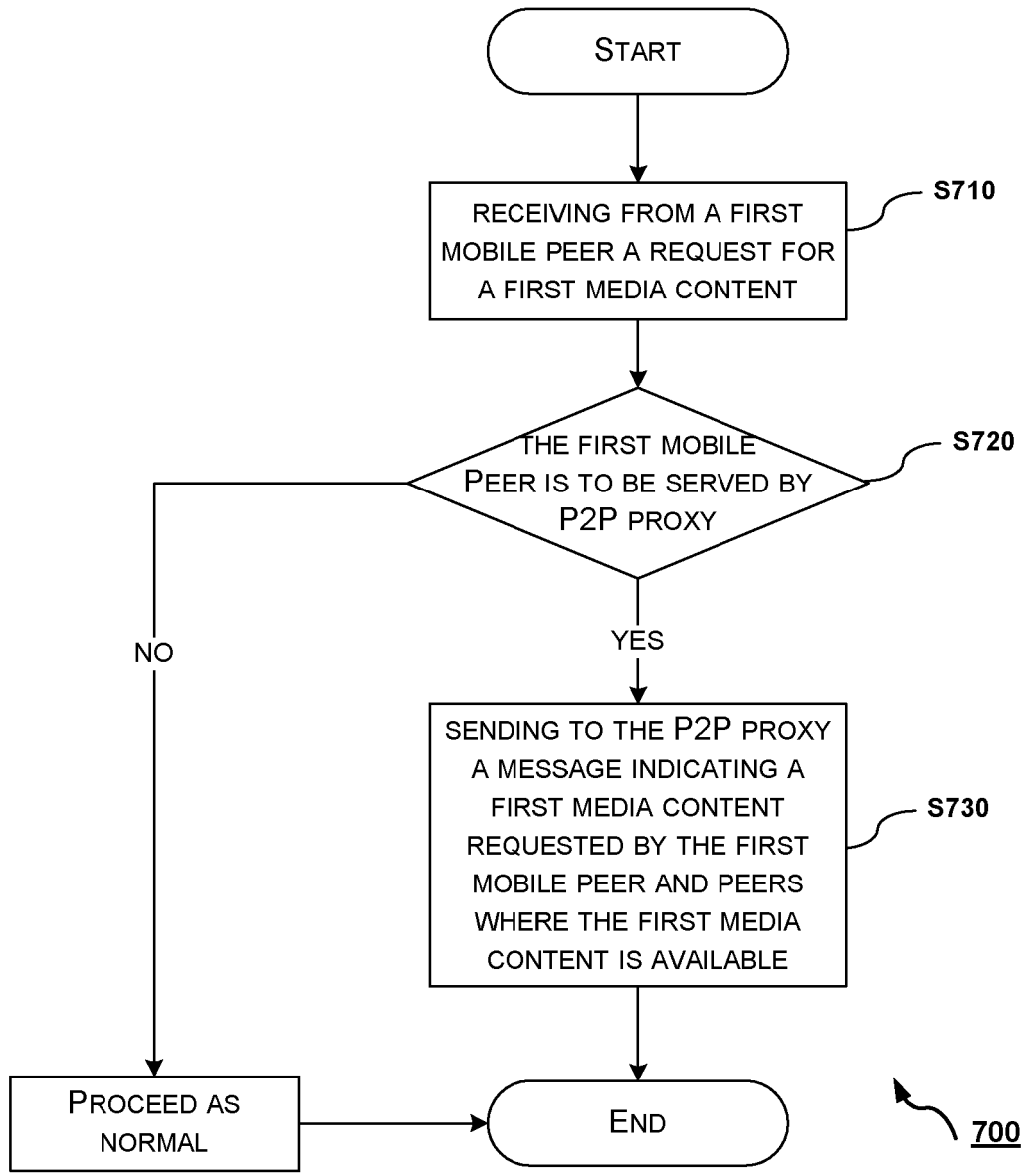
FIG. 7 shows a flowchart of a method 700 for use in a P2P streaming system over a mobile network.

FIG. 7 shows a flowchart of a method 700 for use in a P2P streaming system over a mobile network. The P2P streaming system may include at least one P2P proxy, at least one P2P tracker and a plurality of mobile peers, e.g., as shown in FIG. 5. The method 700 may be used in a P2P tracker of said at least one P2P tracker and may include the following steps of: receiving from a first mobile peer a request for a first media content (step S710); checking if the first mobile peer is to be served by a P2P proxy of said at least one P2P proxy (step S720); and if it is determined that the first mobile peer is to be served by the P2P proxy, sending to the P2P proxy a message indicating a first media content requested by the first mobile peer and peers where the first media content is available (step S730). Preferably, the peers here may refer to those fixed or mobile peers not served by the first P2P proxy.

As a non-limiting example, the method 700 may further include a step of: if it is determined that the first mobile peer is to be served by the P2P proxy, informing the first mobile peer that the first media content is available on the P2P proxy. For example, the P2P tracker may send an ID of the P2P proxy to the first mobile peer.

As a non-limiting example, before receiving from the first mobile peer the request for the first media content, the method 700 may further include a step of receiving from the P2P proxy a registration message indicating the P2P proxy is to serve a set of mobile peers in the plurality of mobile peers and information indicating which mobile peers are served by the P2P proxy.

In this example, the information indicating which mobile peers are served by the P2P proxy may depend on uplink load information.

Alternatively, the information indicating which mobile peers are served by the P2P proxy may be a list of IDs of the set of mobile peers or a list of IDs of cells where each mobile peer in the set of mobile peers is located.

In this case, the method 700 may further include a step of storing the information indicating which mobile peers are served by the P2P proxy.

Alternatively, the method 700 may further include a step of sending a registration response to the P2P proxy.

As another non-limiting example, the method 700 may further include the following steps of: receiving from a second peer not served by the P2P proxy a request message to request a second media content present in a mobile peer served by the P2P proxy; and informing the second peer that the second media content is available on the P2P proxy.

Figure 8:
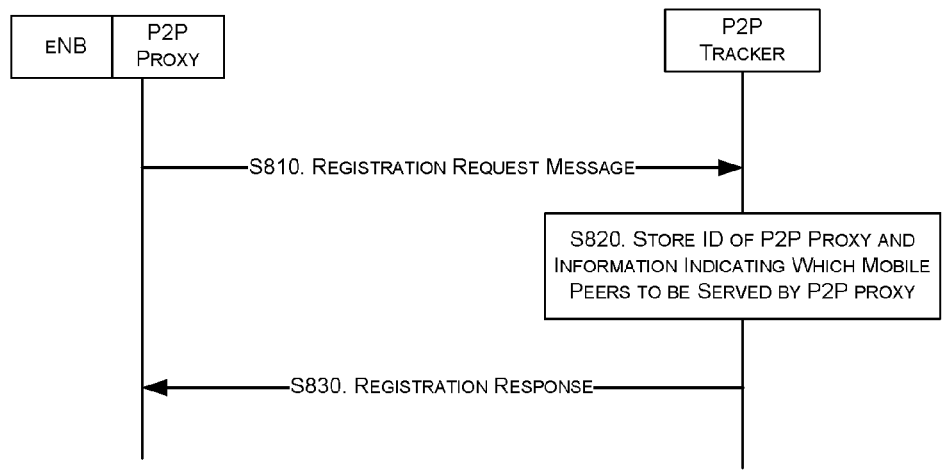
FIG. 8 shows a sequence diagram illustrating a registration procedure of a P2P proxy in the scenario as shown in FIG. 5 according to the present disclosure.

FIG. 8 shows a sequence diagram illustrating a registration procedure of a P2P proxy in the scenario as shown in FIG. 5 according to the present disclosure.

As shown in FIG. 8, the P2P proxy sends a registration request message to the P2P tracker to inform that it will act as a proxy to serve a group of mobile peers (step S810).

The registration request message may include an ID of the P2P proxy and information indicating which mobile peers are to be served by the P2P proxy. For example, the information may include a list of IDs of the mobile peers to be served by the P2P proxy. Alternatively, the information may include a list of IDs of cells where each mobile peer to be served by the P2P proxy is located.

Alternatively, the ID of the P2P proxy and the information indicating which mobile peers are to be served by the P2P proxy may be sent to the P2P tracker independent of the registration request message.

Upon receiving the registration request message from the P2P proxy, the P2P tracker stores the ID of the P2P proxy and the information indicating which mobile peers are to be served by the P2P proxy, e.g., the list of IDs of the mobile peers or the IDs of cells (step S820).

Then, the P2P tracker replies the P2P proxy with a registration response message to confirm that the registration message has been received successfully (step S830). So far, the registration procedure of the P2P proxy has been completed.

Although the P2P proxy here is exemplified as being located in RAN (e.g., an eNB), it may be also located in the edge of CN, such as a gateway of the mobile network.

Figure 9:
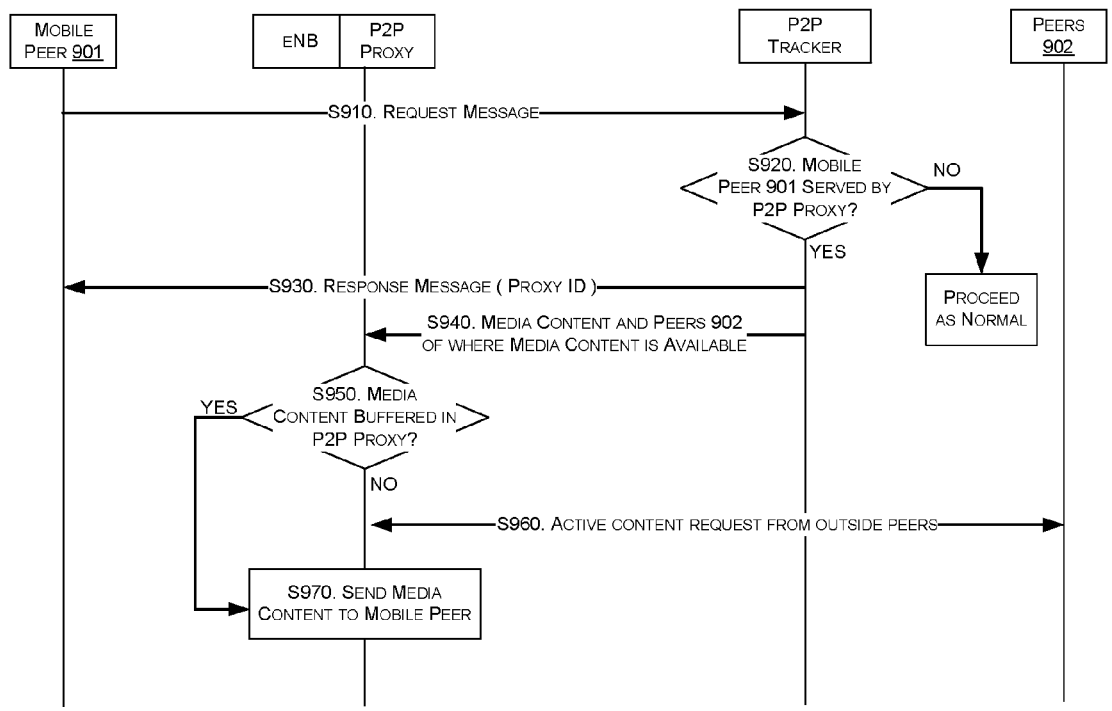
FIG. 9 shows a sequence diagram of P2P streaming procedure using a P2P proxy according to a first example of the present disclosure.

With the registration as illustrated by FIG. 8 in mind, a sequence diagram of P2P streaming procedure using a P2P proxy according to a first example of the present disclosure is illustrated in FIG. 9, where a mobile peer 901 served by the P2P proxy requests a media content from another peer 902. Assume that the P2P proxy here has registered with the P2P tracker.

As shown in FIG. 9, a mobile peer sends a request message for a media content to the P2P tracker (step S910). The request message may be encapsulated with location information such as an ID of a cell where the mobile peer is located. The encapsulating may be performed by the mobile peer 901 or a mobile network element such as a gateway. Alternatively, the location information may be sent from the mobile peer 901 to the P2P tracker independent of the request message.

Upon receiving the request message from the mobile peer 901, the P2P tracker checks if the mobile peer 901 is to be served by the P2P proxy based on the location information of the mobile peer 901 and registration related information of the P2P proxy (step S920).

If the mobile peer 901 is not to be served by a P2P proxy, the P2P streaming procedure of the mobile peer will proceed as normal.

In case the mobile peer 901 is to be served by the P2P proxy, the P2P tracker sends a response message to the mobile peer and informs that the requested media content is available on the P2P proxy (step S930). For example, the P2P tracker may send the ID of the P2P proxy to the mobile peer.

The P2P tracker may inform the P2P proxy that the mobile peer 901 needs to be served (step S940). Specifically, the P2P tracker may send to the P2P proxy a message indicating the media content requested by the mobile peer 901 and peers where the media content is available. The peers here may be fixed or mobile peers, but are not served by the P2P proxy.

Although step S930 is illustrated as occurring before step S940, it will be appreciated that step S930 may be also performed after or simultaneously with step S940.

Upon receiving the message from the P2P tracker, the P2P proxy checks whether the media content has been buffered in the P2P proxy (step S950). If yes, the P2P proxy may directly send the media content to the mobile peer 901.

If the media content is not buffered in the P2P proxy, the P2P proxy actively initiates a P2P session with at least one or more peers among the peers to fetch the media content (step S960).

Then, the P2P proxy may send the media content to the mobile peer 901 (step S970). During this process, the P2P proxy may interface with the mobile peer 901 by acting as a normal mobile peer. That is, this process is similar to the existing P2P procedure. Therefore, the detailed description is omitted here so as to avoid obscuring the concept of the present application.

As a non-limiting example, after establishing a P2P session between the first P2P proxy and the first mobile peer, the P2P proxy may actively send to the mobile peer buffer map information about the requested first media content without receiving a request from the mobile peer. This may avoid the request from a mobile peer, thereby reducing signaling overhead at the mobile peer side. In this case, the buffer map information may be constructed based on the media content.

As a non-limiting example, the media content may include a plurality of media chunks. For example, each media chunk may be fetched from a different peer. In this example, step S970 may include bundling the plurality of media chunks into one or more packages, each package having a bigger size than each media chunk; and transmitting the one or more packages to the first media peer in a burst. In this way, for example, the buffer map and chunk size may be adapted based on the radio status and streaming requirement, while the signaling overhead at the mobile peer may be further reduced.

As an option, the P2P proxy may update the peers to be served by itself and inform the P2P tracker by e.g., sending an update registration message to the P2P tracker.

Figure 10:
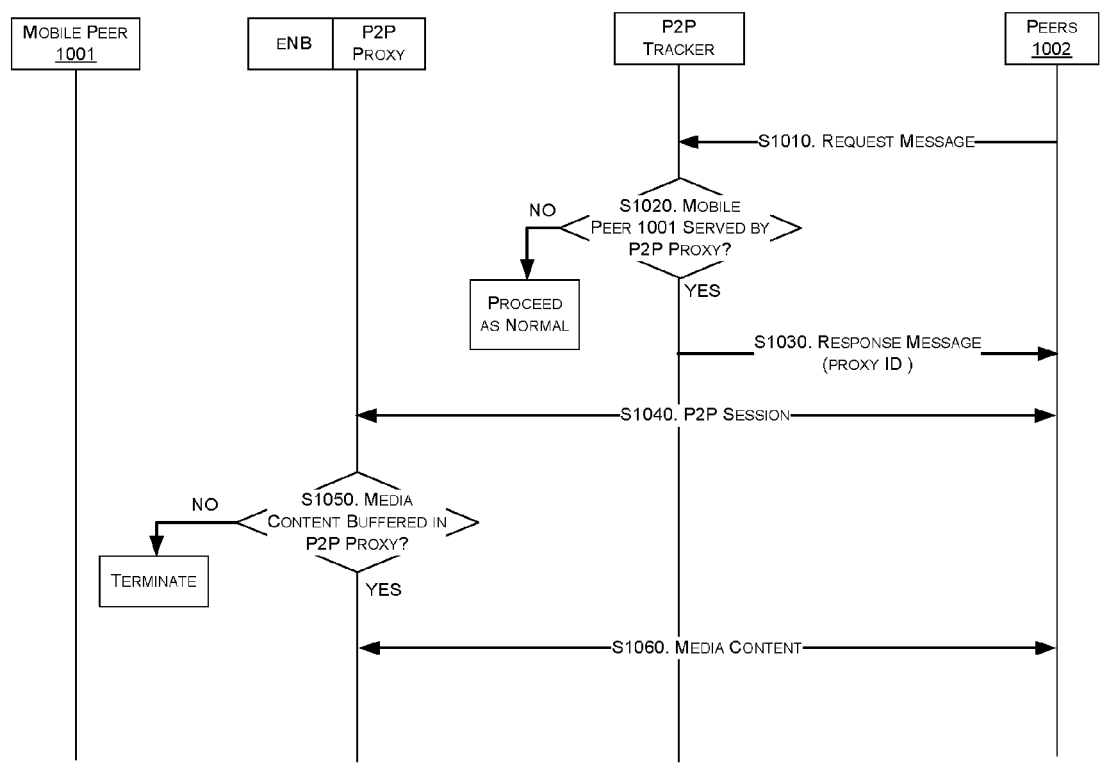
FIG. 10 shows a sequence diagram of P2P streaming procedure using a P2P proxy according to a second example of the present disclosure.

With the registration as illustrated by FIG. 8 in mind, a sequence diagram of P2P streaming procedure using a P2P proxy according to a second example of the present disclosure is illustrated in FIG. 10, where a peer 1002 requests a media content from a mobile peer 1001 served by the P2P proxy. Assume that the P2P proxy here has registered with the P2P tracker.

As shown in FIG. 10, the peer 1002 sends a request message for a media content to the P2P tracker (step S1010). The request message here may be a normal request message or may be the same with that sent in step S910. The media content is available in the mobile peer 1001.

Upon receiving the request message, the P2P tracker checks whether the mobile peer 1001 is to be served by the P2P proxy (step S1020). If no, the procedure proceeds in the normal manner. Otherwise, the P2P may send a response message by having an ID of the P2P proxy contained thereon (step S1030), so as to inform the peer 1002 that the requested media content is available on the P2P proxy, instead of the mobile peer 1001. Then, the peer 1002 may initiate a session with the P2P proxy (step S1040).

The P2P proxy may check whether the requested media content is buffered in the P2P proxy (step S1050), and if yes, sends the buffered media content to the peer 1002 (step S1060).

If the requested media content is not buffered in the P2P proxy, the process will terminate.

It should be appreciated that the peer 1001 may be a either mobile or fixed peer.

In this manner, UL contribution of the mobile peer 1001 may be refrained.

Figure 11:
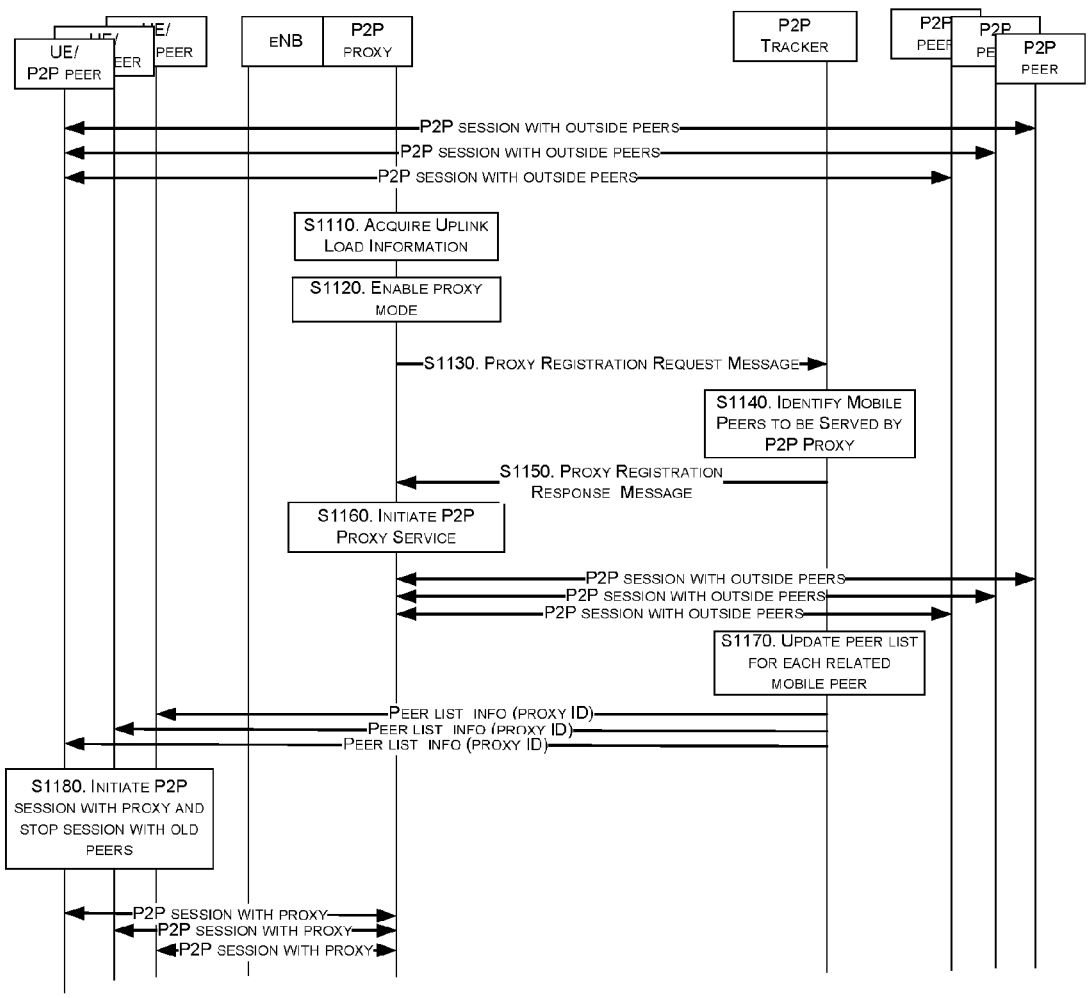
FIG. 11 shows a sequence diagram of P2P streaming procedure using a P2P proxy according to a third example of the present disclosure.

FIG. 11 shows a sequence diagram of P2P streaming procedure using a P2P proxy according to a third example of the present disclosure. In this example, initially, some mobile peers located in mobile networks are directly sharing some streaming content with other peers located in fixed/wireless access networks by some P2P sessions.

As shown in FIG. 11, the P2P proxy may acquire uplink load information of a cell in the mobile network (step S1110).

Preferably, the uplink load may include the UL cell load, eNB scheduler load, or backhaul link load related to certain eNB.

As a non-limiting example, in order to acquire such information, the P2P proxy may send a request message to an eNB to subscribe the uplink load information, such as the UL cell load, eNB scheduler load, or backhaul link load related to the eNB. Then, the eNB may measure related RAN load status as subscribed by the P2P proxy. In case the cell UL load and/or eNB scheduler and/or backhaul uplink load exceeds a specific threshold, i.e., the eNB is about to be overloaded, the eNB may send a load status report message to the P2P proxy to inform that certain cell is about overloaded. It will be appreciated that the uplink load information may be obtained in any other appropriated manners.

Upon the reception of the congestion notification message, the P2P proxy knows that it's time to enable the P2P proxy function or disable UL contribution for peers located in related cells. Thus, the P2P proxy may enable a P2P proxy mode and thus initiate a P2P proxy service (step 1120).

Then the P2P proxy sends a proxy registration request message to the P2P tracker to inform that it will serve some mobile peers located in certain cells (step 1130). For example, the message may include area information indicated by e.g., one or more cell IDs to be covered. Alternatively, the proxy registration request message here may be similar to the registration request message sent in step S810.

Upon receiving the registration request message, the P2P tracker identifies mobile peers to be served by the P2P proxy based on e.g., location information of each mobile peer (step S1140). Then, the P2P tracker replies the P2P proxy with a proxy registration response message (step S1150). For example, the proxy registration response message may include a list of IDs of peers to be served, Channel ID associated with each peer to be served, and a list of IDs of outside neighbor peers related to each channels. Alternatively, the proxy registration response message here may be similar to the registration response message sent in step S830.

The P2P proxy initiates a P2P proxy service (step S1160), and initiates a P2P session with informed outside peers and to fetch chunks data of each informed channels.

The P2P tracker updates peer list for each related mobile peer (step S1170). Thereafter, the P2P tracker may enable the P2P proxy service for related mobile peers by sending peer list info to related mobile peers, which may include the ID of the P2P proxy instead of IDs of existing peers.

Upon receiving the peer list info message with update neighbors, the mobile peer initiates the P2P session with the new neighbor (the P2P proxy) peer immediately and stops the P2P sessions with existing neighbor peers (step S1180).

With such a solution, the present disclosure may enable the P2P proxy function or disable UL contribution from certain mobile peers.

Figure 12:
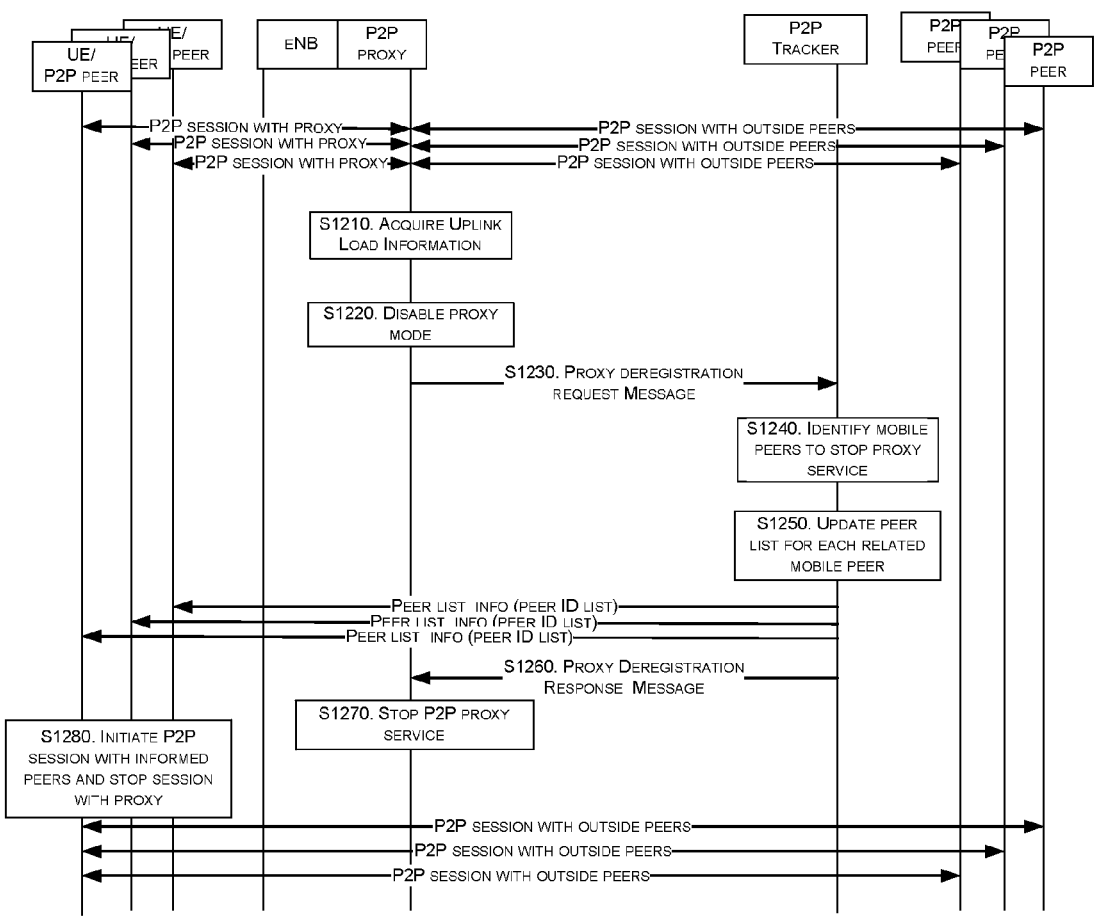
FIG. 12 shows a sequence diagram of P2P streaming procedure using a P2P proxy according to a fourth example of the present disclosure.

FIG. 12 shows a sequence diagram of P2P streaming procedure using a P2P proxy according to a fourth example of the present disclosure. In this example, initially, some mobile peers located in mobile networks are sharing some streaming content with other peers located in fixed/wireless access networks by some P2P sessions via a P2P proxy.

As shown in FIG. 12, the P2P proxy may acquire uplink load information of a cell in the mobile network (step S1210).

Preferably, the uplink load may include the UL cell load, eNB scheduler load, backhaul link load related to certain eNB.

As a non-limiting example, in order to acquire such information, the eNB measures related RAN load status as subscribed by the P2P Proxy as describe above. In case the uplink load information indicates that overloaded status of the eNB has disappeared, for example, the cell UL load is lower than a specific threshold, the eNB may send a load status report message to the P2P proxy to inform that overloaded status of certain cell has disappeared.

Upon the reception of the cell load status update message indicating the congestion/overloaded situation disappeared, the P2P proxy knows that it's time to disable the P2P proxy function (or enable UL contribution) for peers located in related cells. Thus, the P2P proxy may disable the P2P proxy mode (step S1220).

Then, the P2P proxy sends a deregistration request message to the P2P tracker to inform that it will not serve some mobile peers located in certain cells (step S1230). For example, the message may include area information indicated by e.g., one or more cell IDs.

Upon receiving the proxy deregistration request message, the P2P proxy identifies mobile peers served by the P2P proxy based on e.g., location information of each mobile peer, to stop proxy service (step S1240). Then, the P2P tracker updates the peer list for the related mobile peers (step S1250).

The P2P tracker sends to mobile peers the peer list info message, which may include the list of the ID of neighbor peers instead of the ID of the P2P proxy for the mobile peer, so as to disable the P2P proxy service for related mobile peers.

The P2P tracker replies the P2P proxy with a proxy deregistration response message to confirm that related mobile peers will not be served by the P2P proxy (step S1260).

Upon the reception of the proxy deregistration response message from the tracker, the P2P proxy may actively terminate the P2P session with related mobile peers and/or outside peers (step S1270).

Meanwhile, upon receiving the peer list into message with update neighbors, the mobile peers may initiate P2P sessions with new neighbors and stop the sessions with existing neighbor peers (the P2P proxy) (step S1280).

With such a solution, the present disclosure may disable the P2P proxy function or enable UL contribution from certain mobile peers.

Figure 13:
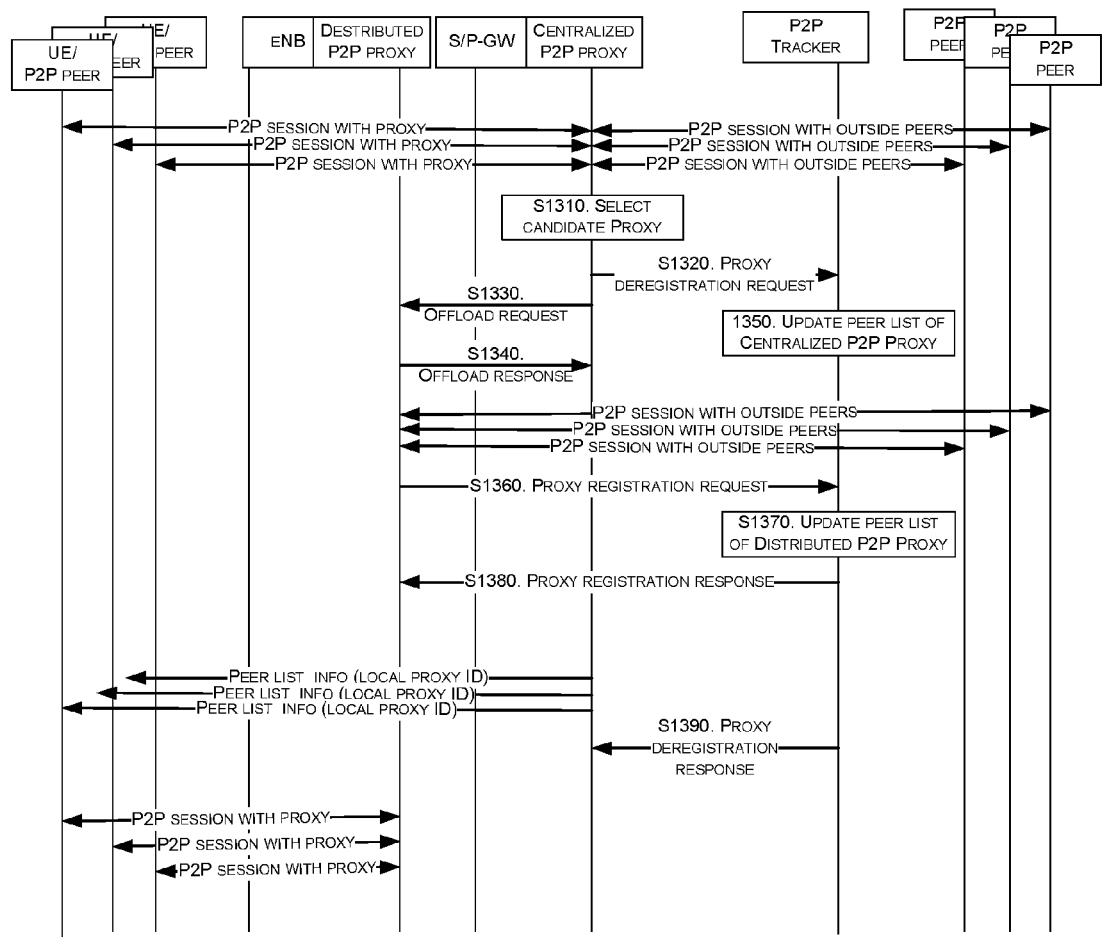
FIG. 13 shows a sequence diagram of P2P streaming procedure using a P2P proxy according to a fifth example of the present disclosure.

FIG. 13 shows a sequence diagram of P2P streaming procedure using a P2P proxy according to a fifth example of the present disclosure. In this example, assume that some mobile peers located in mobile networks are initially sharing some streaming content with other peers located in fixed/wireless access networks by some P2P sessions by using a centralized P2P proxy located in the gateway.

The centralized P2P proxy measures its own load status and/or backhaul link load status between related distributed P2P proxy and the centralized P2P proxy. In case the P2P proxy is about to be overloaded or UL of the certain backhaul link is overloaded, the centralized P2P proxy may select a distributed P2P proxy to take over offloaded P2P traffic (step S1310).

As a non-limiting example, the distributed P2P proxy may be selected by a certain criteria, such as based on the number of peers that can be served by the distributed P2P proxy or based on backhaul link load status between the centralized P2P proxy and the distributed P2P proxy.

The centralized P2P proxy sends an offload request message to the selected distributed P2P proxy to inform that the certain mobile peers needs to be served by the distributed P2P proxy (step S1320). For example, the message may include the following information: the area to be offloaded (e.g., a list of cell IDs), a list of IDs of peers to be offloaded, channel information associated with each peer, outside peer list associated with each channel.

Upon receiving the offload request message, the distributed P2P proxy sends an offload response message to the centralized P2P proxy to confirm the offload request message (step S1330).

The centralized P2P proxy sends a proxy deregistration request message to the P2P tracker to inform that it will not serve some mobile peers located in certain areas any more (step S1340). For example, the message may include the area to be offloaded (a list of cell ID).

The P2P tracker then updates the area served by the centralized P2P proxy based on the proxy deregistration request from the P2P proxy (step S1350).

Meanwhile, the distributed P2P proxy establishes P2P sessions with related outside peers to retrieve media chunks of each informed channel.

Although steps S1320 and S1330 are illustrated as occurring before steps S1340 and S1350, it will be appreciated that steps S1320 and S1330 may be also performed after or simultaneously with steps S1340 and S1350.

The distributed P2P proxy sends a proxy registration request message to the P2P tracker to inform that it will serve some peers located in certain area (step S1360). For example, the message proxy registration request may include area information indicated by e.g., one or more cell IDs. Alternatively, the proxy registration request message here may be similar to the registration request message sent in step S810.

The P2P tracker then updates the area served by the distributed P2P proxy based on the message from the P2P proxy (step S1370), and sends a proxy response message to the distributed P2P proxy to confirm the proxy registration request message sent in step S1360 (step S1380). Alternatively, the proxy response message here may be similar to the registration response message sent in step S830.

The centralized P2P proxy sends peer list information to related mobile peers with an updated neighbor peer (i.e., the ID of the distributed P2P proxy) so as to enables the change of proxy for certain mobile peers.

The P2P tracker may send a proxy deregistration response message to the centralized P2P proxy confirm the proxy registration request message sent in step S1320 (step S1390).

Upon receiving the peer list information with update neighbors, the mobile peers initiate P2P session with the new neighbor (i.e., the distributed P2P proxy) and stops P2P sessions with the existing neighbor peer (i.e., the centralized P2P proxy).

Meanwhile, the centralized P2P proxy terminates P2P sessions with related peers and stops fetching media chunks from outside peers.

Figure 14:
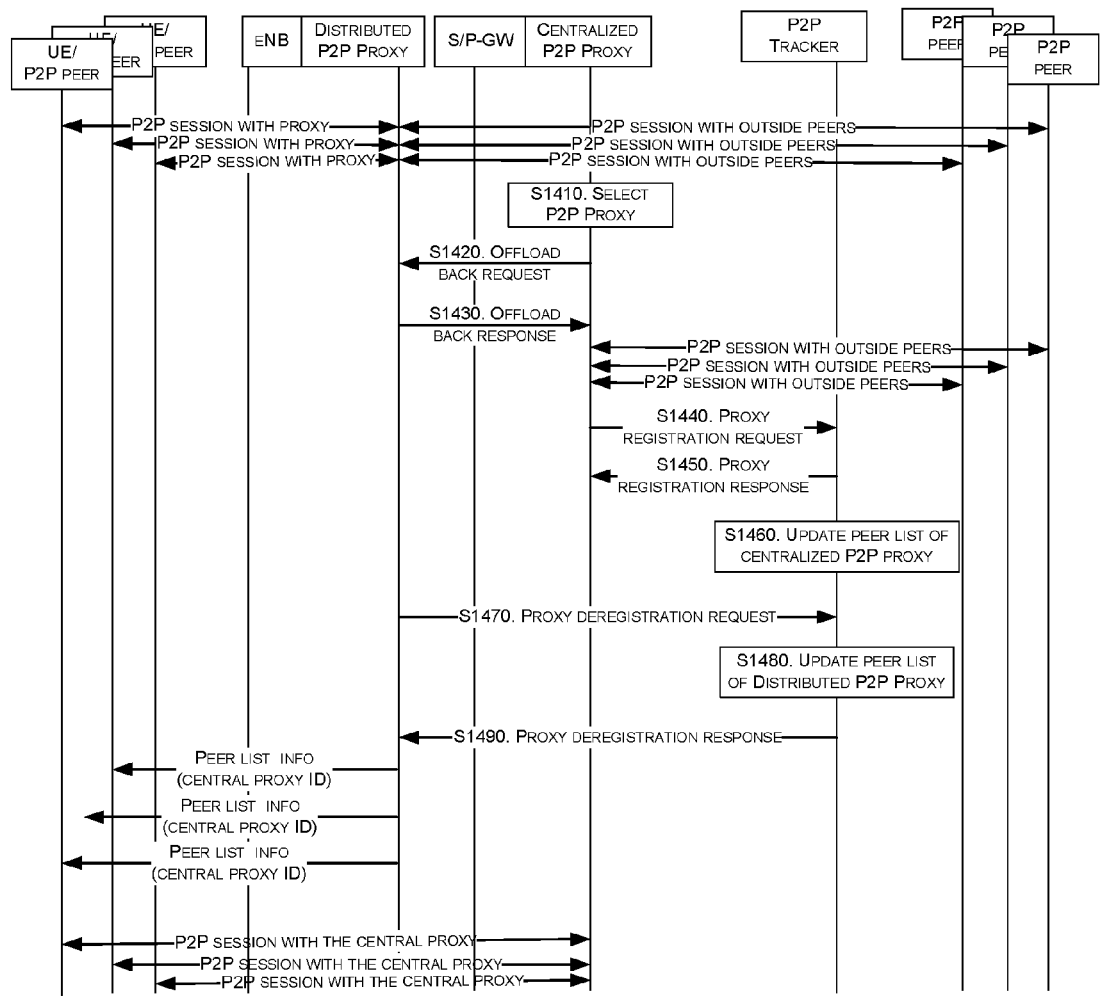
FIG. 14 shows a sequence diagram of P2P streaming procedure using a P2P proxy according to a sixth example of the present disclosure.

FIG. 14 shows a sequence diagram of P2P streaming procedure using a P2P proxy according to a sixth example of the present disclosure. In this example, assume that some mobile peers located in mobile networks are initially sharing some streaming content with other peers located in fixed/wireless access networks by some P2P sessions by using a distributed P2P proxy located in the eNB.

The centralized P2P proxy measures its own load status and/or backhaul link load status between related distributed P2P proxy and the centralized P2P proxy. In case the overloaded situation has disappeared, the centralized P2P proxy selects a distributed P2P proxy to take over certain P2P traffic (step S1410).

As a non-limiting example, the distributed P2P proxy may be selected by a certain criteria, such as based on the number of peers that can be served by the distributed P2P proxy or based on backhaul link load status between the centralized P2P proxy and the distributed P2P proxy.

The centralized P2P proxy sends an offload back request message to the selected distributed P2P proxy to inform that the certain mobile peers served by the distributed P2P proxy will be taken over by the centralized P2P proxy (step S1420). The message may include following info: the area to be offloaded (a list of cell ID), a list of IDs of peers to be offloaded, channel info associated with each peer, outside peer list associated with each channel.

The distributed P2P proxy confirms the offload back request message by an offload back response message to the centralized P2P proxy (step S1430).

Then, as shown in FIG. 14, the centralized P2P proxy establishes P2P sessions with related outside peers to retrieve media chunks of each informed channel.

Thereafter, the centralized P2P proxy sends a proxy registration request message to the P2P tracker to inform that it will serve some peers located in certain areas (step S1440). The message may include the area to be offloaded (a list of cell ID) or a list of peer ID to be served. Alternatively, the proxy registration request message here may be similar to the registration request message sent in step S810.

The P2P tracker confirms the proxy registration request with a proxy registration response message (step S1450). Alternatively, the proxy registration response message here may be similar to the registration response message sent in step S830.

Then, the P2P tracker updates the area served by the centralized P2P proxy based on the message from the centralized P2P proxy (step S1460).

Meanwhile, the distributed P2P proxy sends a proxy deregistration message to the P2P tracker to inform that it will not serve some peers located in area anymore (step S1470). The message should include area information indicated by e.g., one or more cell IDs.

The P2P tracker updates the area served by the distributed P2P proxy based on the message from the distributed P2P proxy (step S1480).

The P2P tracker confirms the proxy deregistration request message by a proxy deregistration response message to the distributed P2P proxy (step S1490).

Then, the distributed P2P proxy terminates P2P sessions with related peers and stops fetching media chunks from outside peers.

The centralized P2P proxy enables the change of P2P proxy by the peer list info message to related mobile peers with an updated neighbor peer (the ID of the centralized P2P proxy).

Upon receiving the peer list info message with update neighbors, the mobile peer initiates the P2P session with the new neighbor (the centralized P2P proxy) and stops the P2P sessions with existing neighbor peers (the distributed P2P proxy).

Although FIGS. 13 and 14 are both exemplified in the context of a distributed P2P proxy and a centralized P2P proxy, it will be appreciated that they are only for illustration purpose and the schemes as illustrated in combination with FIGS. 13 and 14 may be also applied in any two P2P proxies of the same or different forms.

With the examples as shown in FIGS. 13 and 14, the present application may dynamically adjust the P2P proxy between different P2P proxies based on load of related P2P proxy and/or the backhaul link load of the mobile network.

It will be appreciated that the backhaul link load here may refer to backhaul uplink load or backhaul downlink load. This may depend on the applied transport technology, such as Ethernet, SDH, etc.

Figure 15:
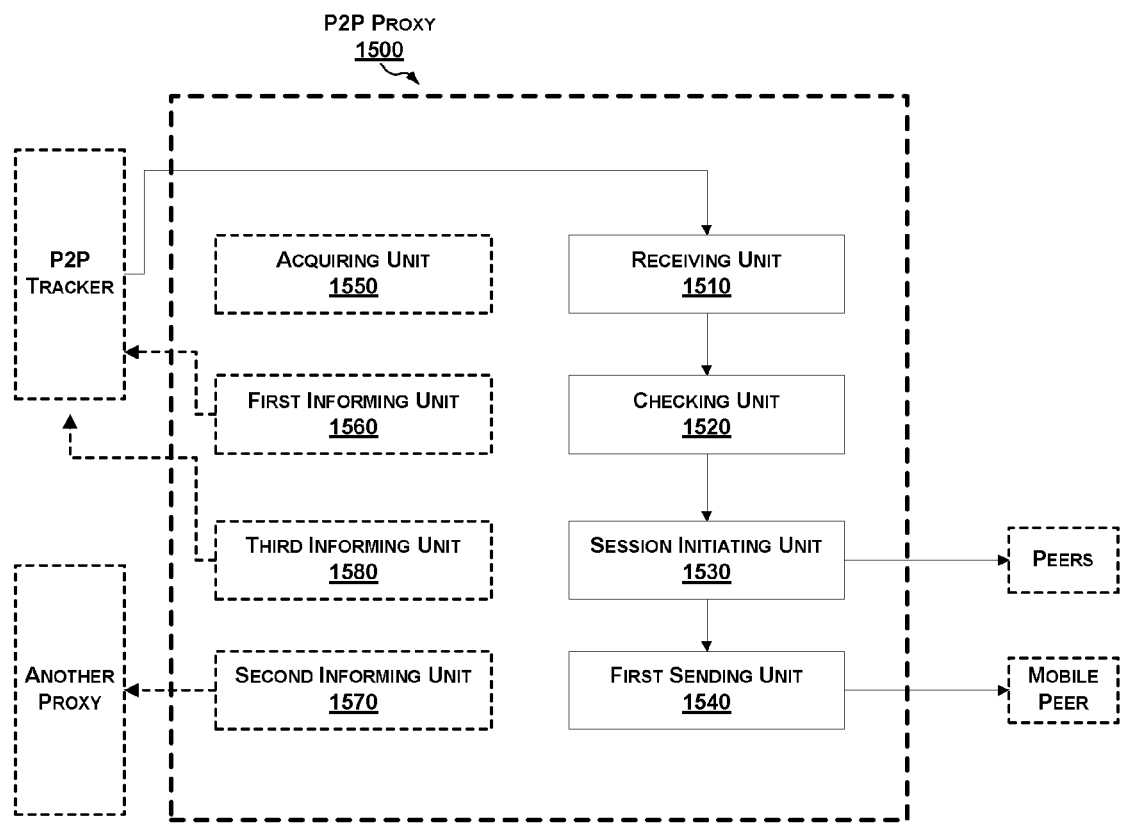
FIG. 15 shows a schematic diagram of a P2P proxy 1500 according to an embodiment of the present disclosure.

FIG. 15 shows a schematic diagram of a P2P proxy 1500 according to an embodiment of the present disclosure. The P2P proxy 1500 may be used in a P2P streaming system over a mobile network, which may include at least one P2P proxy, at least one P2P tracker and a plurality of mobile peers.

As shown in FIG. 15, the P2P proxy 1500 may include a receiving unit 1510, a checking unit 1520, a session initiating unit 1530, a first sending unit 1540, an acquiring unit 1550, a first informing unit 1560, a second informing unit 1570, and a third informing unit 1580. The acquiring unit 1550, the first informing unit 1560, the second informing unit 1570, and the third informing unit 1580 are optional and denoted in dotted lines as shown in FIG. 15.

The receiving unit 1510 may be configured to receive from a P2P tracker of said at least one P2P tracker a notification message indicating a first mobile peer to be served by the P2P proxy and request information of the first mobile peer indicating a first media content requested by the first mobile peer and peers where the first media content is available. Alternatively, the peers may be fixed or mobile peers and are not served by the P2P proxy.

The checking unit 1520 may be configured to check whether the first media content is buffered in the P2P proxy 1500.

The session initiating unit 1530 may be configured to initiate a P2P session with at least one or more peers among the peers to fetch the first media content, when the first media content is not buffered in the P2P proxy 1500. The peers here may refer to outside peers of the P2P proxy 1500, and may be either mobile or fixed peers.

The first sending unit 1540 may be configured to send the fetched first media content to the first mobile peer.

As a non-limiting example, the first sending unit 1540 may be further configured to send the first media content to the first mobile peer when the first media content is buffered in the P2P proxy 1500.

As a non-limiting example, the acquiring unit 1550 may be configured to acquire uplink load information of a cell in the mobile network, and the first informing unit 1560 may be configured to inform the P2P tracker that the P2P proxy 1500 will serve a number of mobile peers located in the cell or the P2P proxy will not serve the number of mobile peers located in the cell, based on the uplink load information.

Alternatively, the first informing unit 1560 may be configured to inform the P2P tracker that the P2P proxy 1500 will serve the number of mobile peers located in the cell, when the uplink load is higher than a first predetermined threshold.

Alternatively, the first informing unit 1560 may be configured to inform the P2P tracker that the P2P proxy will not serve the number of mobile peers located in the cell, when the uplink load is lower than a second predetermined threshold.

It will be appreciated that the first and second predetermined thresholds may depend on the actual radio environment, and the first predetermined threshold may be equal to or greater than the second predetermined threshold.

As a non-limiting example, the second informing unit 1570 may be configured to inform another P2P proxy selected from said at least one P2P proxy that at least a part of mobile peers served by the P2P proxy 1500 need to be served by the another P2P proxy when load of the P2P proxy 1500 and/or backhaul link load of the mobile network exceeds a third predetermined threshold, and the third informing unit 1380 may be configured to inform the P2P tracker that the P2P proxy 1500 will not serve the at least part of mobile peers.

In this example, the other P2P proxy may be located in a gateway or a base station of the mobile network.

Alternatively, the second informing unit 1570 may be further configured to inform the another P2P proxy that the at least part of mobile peers will be served by the P2P proxy 1500 again, when the load of the P2P proxy 1500 and/or backhaul link load of the mobile network becomes lower than a fourth predetermined threshold.

It will be appreciated that the third and fourth predetermined thresholds may depend on the actual radio environment, and the third predetermined threshold may be equal to or greater than the fourth predetermined threshold.

It will be appreciated that the backhaul link load here may refer to backhaul uplink load or backhaul downlink load. This depends on the applied different transport technologies.

As a non-limiting example, the P2P proxy 1500 may further include a second sending unit (not shown). The second sending unit may be configured to, if a second peer not served by the P2P proxy 1500 requests from the P2P tracker a second media content available in a mobile peer served by the P2P proxy 1500, send the second media content to the second peer when the second media content is buffered in the P2P proxy 1500.

As a non-limiting example, the first media content may include a plurality of media chunks. In this case, the first sending unit 1540 may include a bundling unit and a transmitting unit (not shown). The bundling unit may be configured to bundle the plurality of media chunks into one or more packages, each package having a bigger size than each media chunk. The transmitting unit may be configured to transmit the one or more packages to the first media peer in a burst.

It should be noted that two or more different units in this disclosure may be logically or physically combined. For example, the receiving unit 1510 and the acquiring unit 1550 may be combined as one single unit, and the first sending unit 1540 and the first informing unit 1560 may be combined as one single unit. Moreover, sending functions of the different sending units may be implemented in one single unit.

Figure 16:
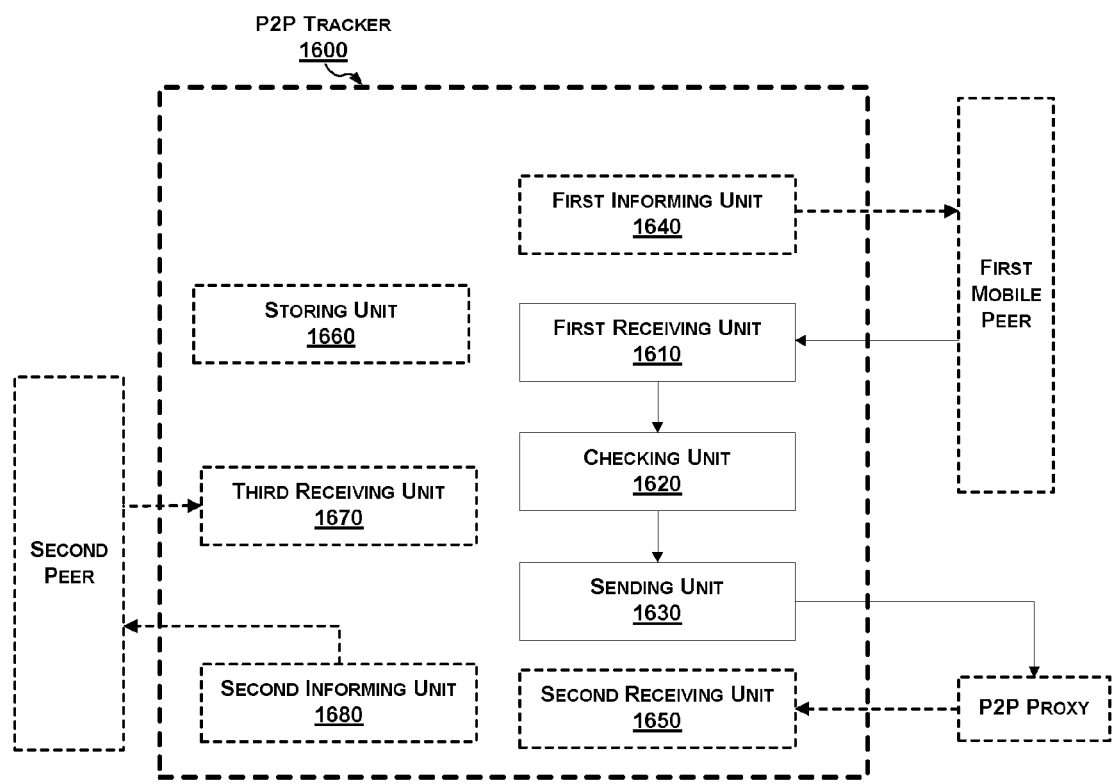
FIG. 16 shows a schematic diagram of a P2P tracker 1600 according to an embodiment of the present disclosure.

FIG. 16 shows a schematic diagram of a P2P tracker 1600 according to an embodiment of the present disclosure. The P2P tracker 1600 may be used in a P2P streaming system over a mobile network, which may include at least one P2P proxy, at least one P2P tracker and a plurality of mobile peers.

As shown in FIG. 16, the P2P tracker 1600 may include a first receiving unit 1610, a checking unit 1620, a sending unit 1630, a first informing unit 1640, a second receiving unit 1650, a storing unit 1660, a third receiving unit 1670, and a second informing unit 1680. The first informing unit 1640, the second receiving unit 1650, the storing unit 1660, the third receiving unit 1670, and the second informing unit 1680 are optional and denoted in dotted lines as shown in FIG. 16.

The first receiving unit 1610 may be configured to receive from a first mobile peer a request for a first media content.

The checking unit 1620 may be configured to check if the first mobile peer is to be served by a P2P proxy of said at least one P2P proxy.

The first informing unit 1640 may be configured to, if it is determined that the first mobile peer is to be served by the P2P proxy, inform the first mobile peer that the first media content is available on the P2P proxy.

As a non-limiting example, the sending unit 1630 may be configured to, if it is determined that the first mobile peer is to be served by the P2P proxy, send to the P2P proxy a message indicating a first media content requested by the first mobile peer and peers where the first media content is available. Preferably, the peers may be fixed or mobile peers and are not served by the P2P proxy.

The second receiving unit 1650 may be configured to, before the first receiving unit 1610 receiving from the first mobile peer the request for the first media content, receive from the P2P proxy a registration message indicating the P2P proxy is to serve a set of mobile peers in the plurality of mobile peers and information indicating which mobile peers are served by the P2P proxy.

Alternatively, the information indicating which mobile peers are served by the P2P proxy depends on uplink load information.

Alternatively, the information indicating which mobile peers are served by the P2P proxy may be a list of IDs of the set of mobile peers or a list of IDs of cells where each mobile peer in the set of mobile peers is located.

Alternatively, the storing unit 1660 may configured to store the information indicating which mobile peers are served by the P2P proxy.

Alternatively, the sending unit 1630 may be further configured to send a registration response to the P2P proxy.

As a non-limiting example, the third receiving unit 1670 may be configured to receive from a second peer not served by the P2P proxy a request message to request a second media content present in a mobile peer served by the P2P proxy, and the second informing unit 1680 may be configured to inform the second peer that the second media content is available on the P2P proxy.

According to foregoing embodiments of the present disclosure, the present disclosure may achieve at least one of the following advantages:

The P2P proxy is transparent to P2P peers and has no impact on P2P peers;

UL traffic on radio is refrained, thereby leading to power saving for UE;

P2P C-plane traffic is reduced, and further optimization of C-plane is achievable;

Backhaul resource may be saved in case the load of a centralized P2P proxy is not too high;

DL U-plane could be further optimized;

It is possible to make full use of the strength of unicast and P2P system at different situation dynamically by taking radio network load status into account; and It can combine the strength of centralized P2P proxy architecture and distributed P2P proxy architecture together by taking mobile network load status info and load of proxy into account.

Other arrangements of the present disclosure include software programs performing the steps and operations of the method embodiments, which are firstly generally described and then explained in detail. More specifically, a computer program product is such an embodiment, which includes a computer-readable medium with a computer program logic encoded thereon. The computer program logic provides corresponding operations to provide the above described P2P proxy scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g., CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g., a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

3GPP The 3rd Generation Partnership Project
BS Base Station
DL DownLink
DPI Deep Packet Inspection
P2P Peer to Peer RAN Radio Access Network
UE User Equipment
UL UpLink

REFERENCES

[1] A Measurement Study of a Large-Scale P2P IPTV System, Xiaojun Hei, etc. IEEE Transactions on Multimedia, Volume 9, Number 8, December, 2007;
[2] BlueStreaming: Towards Power-Efficient Internet P2P Streaming to Mobile Devices. Yao Liu, etc., ACM Multimedia, 2011.

What is claimed is:

1. A method for use in a Peer to Peer (P2P) streaming system over a mobile network, the P2P streaming system comprising at least one P2P proxy, at least one P2P tracker and a plurality of mobile peers, the method being used in a first P2P proxy of said at least one P2P proxy and comprising:
   receiving from a P2P tracker of said at least one P2P tracker a notification message indicating a first mobile peer to be served by the first P2P proxy and request information of the first mobile peer indicating a first media content requested by the first mobile peer and peers where the first media content is available, the peers being not served by the first P2P proxy;
   checking whether the first media content is buffered in the first P2P proxy;
   initiating a P2P session with at least one or more peers among the peers to fetch the first media content, when the first media content is not buffered in the first P2P proxy; and
   sending the fetched first media content to the first mobile peer; further comprising:
   acquiring uplink load information of a cell in the mobile network; and
   informing the P2P tracker that the first P2P proxy will serve a number of mobile peers located in the cell or the first P2P proxy will not serve the number of mobile peers located in the cell, based on the uplink load information.

2. The method according to claim 1, further comprising:
   sending the first media content to the first mobile peer when the first media content is buffered in the first P2P proxy.

3. The method according to claim 1, wherein when the uplink load is higher than a first predetermined threshold, the P2P tracker is informed that the first P2P proxy will serve the number of mobile peers located in the cell.

4. The method according to claim 1, wherein when the uplink load is lower than a second predetermined threshold, the P2P tracker is informed that the first P2P proxy will not serve the number of mobile peers located in the cell.

5. The method according to claim 1, further comprising:
   informing a second P2P proxy selected from said at least one P2P proxy that at least a part of mobile peers served by the first P2P proxy need to be served by the second P2P proxy when load of the first P2P proxy and/or backhaul link load of the mobile network exceeds a third predetermined threshold; and
   informing the P2P tracker that the first P2P proxy will not serve the at least part of mobile peers.

6. The method according to claim 5, wherein the second P2P proxy is located in a gateway or a base station of the mobile network.

7. The method according to claim 5, further comprising:
   informing the second P2P proxy that the at least part of mobile peers will be served by the first P2P proxy again, when the load of the first P2P proxy and/or backhaul link load of the mobile network becomes lower than a fourth predetermined threshold.

8. The method according to claim 1, further comprising:
   if a second peer not served by the first P2P proxy requests from the P2P tracker a second media content available in a mobile peer served by the first P2P proxy, sending the second media content to the second peer when the second media content is buffered in the first P2P proxy.

9. The method according to claim 1 or 2, wherein the first media content includes a plurality of media chunks, and sending the fetched first media content to the first mobile peer comprises:
   bundling the plurality of media chunks into one or more packages, each package having a bigger size than each media chunk; and
   transmitting the one or more packages to the first media peer in a burst.

10. The method according to claim 1, further comprising:
    actively sending to the first mobile peer buffer map information about the requested first media content, after establishing a P2P session between the first P2P proxy and the first mobile peer, the buffer map information being constructed based on the first media content.

11. A method for use in a Peer to Peer (P2P) streaming system over a mobile network, the P2P streaming system comprising at least one P2P proxy, at least one P2P tracker and a plurality of mobile peers, the method being used in a P2P tracker of said at least one P2P tracker and comprising:
    receiving from a first mobile peer a request for a first media content;
    checking if the first mobile peer is to be served by a P2P proxy of said at least one P2P proxy; and
    if it is determined that the first mobile peer is to be served by the P2P proxy, sending to the P2P proxy a message indicating a first media content requested by the first mobile peer and peers where the first media content is available, the peers being not served by the P2P proxy;
    before receiving from the first mobile peer the request for the first media content, further comprising:
    receiving from the P2P proxy a registration message indicating the P2P proxy is to serve a set of mobile peers in the plurality of mobile peers and information indicating which mobile peers are served by the P2P proxy.

12. The method according to claim 11, further comprising:
    if it is determined that the first mobile peer is to be served by the P2P proxy, informing the first mobile peer that the first media content is available on the P2P proxy.

13. The method according to claim 11, wherein the information indicating which mobile peers are served by the P2P proxy depends on uplink load information.

14. The method according to claim 11, wherein the information indicating which mobile peers are served by the P2P proxy is a list of IDs of the set of mobile peers or a list of IDs of cells where each mobile peer in the set of mobile peers is located.

15. The method according to claim 11, further comprising:
    storing the information indicating which mobile peers are served by the P2P proxy.

16. The method according to claim 11, further comprising: sending a registration response to the P2P proxy.

17. The method according to claim 11, further comprising: receiving from a second peer not served by the P2P proxy a request message to request a second media content present in a mobile peer served by the P2P proxy; and
informing the second peer that the second media content is available on the P2P proxy.

18. A Peer to Peer (P2P) proxy for use in a P2P streaming system over a mobile network, the P2P streaming system comprising at least one P2P proxy, at least one P2P tracker and a plurality of mobile peers, the P2P proxy comprising:
a receiving unit configured to receive from a P2P tracker of said at least one P2P tracker a notification message indicating a first mobile peer to be served by the P2P proxy and request information of the first mobile peer indicating a first media content requested by the first mobile peer and peers where the first media content is available, the peers being not served by the P2P proxy;
a checking unit configured to check whether the first media content is buffered in the P2P proxy;
a session initiating unit configured to initiate a P2P session with at least one or more peers among the peers to fetch the first media content, when the first media content is not buffered in the P2P proxy; and
a first sending unit configured to send the fetched first media content to the first mobile peer; further comprising:
an acquiring unit configured to acquire uplink load information of a cell in the mobile network; and
a first informing unit configured to inform the P2P tracker that the P2P proxy will serve a number of mobile peers located in the cell or the P2P proxy will not serve the number of mobile peers located in the cell, based on the uplink load information.

19. The P2P proxy according to claim 18, wherein the first sending unit is further configured to send the first media content to the first mobile peer when the first media content is buffered in the P2P proxy.

20. The P2P proxy according to claim 18, wherein the first informing unit configured to inform the P2P tracker that the P2P proxy will serve the number of mobile peers located in the cell, when the uplink load is higher than a first predetermined threshold.

21. The P2P proxy according to claim 18, wherein the first informing unit configured to inform the P2P tracker that the P2P proxy will not serve the number of mobile peers located in the cell, when the uplink load is lower than a second predetermined threshold.

22. The P2P proxy according to claim 18, further comprising:
a second informing unit configured to inform another P2P proxy selected from said at least one P2P proxy that at least a part of mobile peers served by the P2P proxy need to be served by the another P2P proxy when load of the P2P proxy and/or backhaul link load of the mobile network exceeds a third predetermined threshold; and
a third informing unit configured to inform the P2P tracker that the P2P proxy will not serve the at least part of mobile peers.

23. The P2P proxy according to claim 22, wherein the another P2P proxy is located in a gateway or a base station of the mobile network.

24. The P2P proxy according to claim 22, wherein the second informing unit is further configured to inform the another P2P proxy that the at least part of mobile peers will be served by the P2P proxy again, when the load of the P2P proxy and/or backhaul link load of the mobile network becomes lower than a fourth predetermined threshold.

25. The P2P proxy according to claim 18, further comprising:
a second sending unit configured to, if a second peer not served by the P2P proxy requests from the P2P tracker a second media content available in a mobile peer served by the P2P proxy, send the second media content to the second peer when the second media content is buffered in the P2P proxy.

26. The P2P proxy according to claim 18 or 19, wherein the first media content includes a plurality of media chunks, and the first sending unit comprises:
a bundling unit configured to bundle the plurality of media chunks into one or more packages, each package having a bigger size than each media chunk; and
a transmitting unit configured to transmit the one or more packages to the first media peer in a burst.

27. The P2P proxy according to claim 18, wherein the first sending unit is further configured to actively send to the first mobile peer buffer map information about the requested first media content, after establishing a P2P session between the P2P proxy and the first mobile peer, the buffer map information being constructed based on the first media content.

28. A Peer to Peer (P2P) tracker for use in a P2P streaming system over a mobile network, the P2P streaming system comprising at least one P2P proxy, at least one P2P tracker and a plurality of mobile peers, the P2P tracker comprising:
a first receiving unit configured to receive from a first mobile peer a request for a first media content;
a checking unit configured to check if the first mobile peer is to be served by a P2P proxy of said at least one P2P proxy; and
a sending unit configured to, if it is determined that the first mobile peer is to be served by the P2P proxy, send to the P2P proxy a message indicating a first media content requested by the first mobile peer and peers where the first media content is available, and to the first mobile peer an ID of the proxy, the peers being not served by the P2P proxy; further comprising:
a second receiving unit configured to, before the first receiving unit receiving from the first mobile peer the request for the first media content, receive from the P2P proxy a registration message indicating the P2P proxy is to serve a set of mobile peers in the plurality of mobile peers and information indicating which mobile peers are served by the P2P proxy.

29. The P2P tracker according to claim 28, further comprising:
a first informing unit configured to, if it is determined that the first mobile peer is to be served by the P2P proxy, inform the first mobile peer that the first media content is available on the P2P proxy.

30. The P2P tracker according to claim 28, wherein the information indicating which mobile peers are served by the P2P proxy depends on uplink load information.

31. The P2P tracker according to claim 28, wherein the information indicating which mobile peers are served by the P2P proxy is a list of IDs of the set of mobile peers or a list of IDs of cells where each mobile peer in the set of mobile peers is located.

32. The P2P tracker according to claim 28, further comprising:
a storing unit configured to store the information indicating which mobile peers are served by the P2P proxy.

33. The P2P tracker according to claim 28, wherein the sending unit is further configured to send a registration response to the P2P proxy.

34. The P2P tracker according to claim 28, further comprising:
   a third receiving unit configured to receive from a second peer not served by the P2P proxy a request message to request a second media content present in a mobile peer served by the P2P proxy; and
   a second informing unit configured to inform the second peer that the second media content is available on the P2P proxy.

* * * * *